US006361255B1

(12) United States Patent
Schmotzer

(10) Patent No.: US 6,361,255 B1
(45) Date of Patent: Mar. 26, 2002

(54) DRILL BIT WITH INSCRIBER

(75) Inventor: Norman H. Schmotzer, North Palm Beach, FL (US)

(73) Assignee: B & A Manufacturing Co., Riviera Beach, FL (US)

( * ) Notice: Subject to any disclaimer, the term of this patent is extended or adjusted under 35 U.S.C. 154(b) by 0 days.

(21) Appl. No.: 09/702,247

(22) Filed: Oct. 30, 2000

(51) Int. Cl.[7] .............................................. B23B 51/02
(52) U.S. Cl. ........................ 408/1 R; 408/214; 408/213
(58) Field of Search ................................ 408/212–214, 408/1 R

(56) References Cited

U.S. PATENT DOCUMENTS

| | | | | | |
|---|---|---|---|---|---|
| 567,271 | A | * | 9/1896 | Howard et al. | 408/213 |
| 1,025,109 | A | * | 4/1912 | Butler | 408/213 |
| 1,417,760 | A | * | 5/1922 | McPherson | 408/213 |
| 1,887,374 | A | | 11/1932 | Emmons | |
| RE19,182 | E | | 5/1934 | Emmons | |
| 4,008,976 | A | | 2/1977 | Holzl | |
| 4,134,616 | A | | 1/1979 | Christensen | |
| 4,143,723 | A | | 3/1979 | Schmotzer | |
| 4,356,873 | A | | 11/1982 | Dziak | |
| 5,244,319 | A | * | 9/1993 | Cochran | 408/214 |
| 5,975,813 | A | * | 11/1999 | Schmotzer | 408/214 |
| 6,024,520 | A | | 2/2000 | Haughton et al. | 408/212 |

* cited by examiner

*Primary Examiner*—Steven C. Bishop
(74) *Attorney, Agent, or Firm*—McHale & Slavin

(57) ABSTRACT

A self feeding drill bit for making a smooth bore in a workpiece has a spiral land and flute with a leading end carrying a centered lead screw. The leading end of the bit has a cutter extending from said lead screw to the circumference of the bit. Diametrically opposed to the cutter is an inscriber formed as a curved blade by the periphery of the leading land. In use, the inscriber makes a smooth surfaced cut in the workpiece with the cutter removing the remainder of the workpiece within the scribed cut.

18 Claims, 2 Drawing Sheets

DRILL BIT WITH INSCRIBER

This application is related to U.S. Pat. No. 5,975,813 issued Nov. 2, 1999 to Norman H. Schmotzer.

FIELD OF THE INVENTION

This invention relates generally to self feeding drill bits and a method of producing a smooth bore hole in wood.

BACKGROUND OF THE INVENTION

In certain applications, it is necessary for a precise bore to be placed in a workpiece. The bore must have a perfect cross section, in shape, as well as, be free from a score line. The entrance and exit holes, as well as, the workpiece bore must be free of, "frazzle," or small splinters of the workpiece.

For example, electric power companies have certain safety standards, as mentioned above, which apply to holes made in power poles. If these standards are not met, the pole is rejected for use which causes re-drilling or dressing. In the extreme, the pole is discarded. Either of these results, require added labor and materials which increase the costs of the product.

Also, in the building trades, finish work requires smooth unmarred apertures in more expensive woods. In the construction of log homes, precise bores, without frazzle, are required for safety reasons and desired for aesthetics. The woods used for these homes are usually a more expensive species. Any marred or unsafe bores would require more costs through more labor and materials.

DESCRIPTION OF THE PRIOR ART

Drill bits are conventional mechanical components of drills. The bit has a shank with structure for cooperating with the drill to secure the bit and drill together without relative rotational movement between them to insure that when the drill turns so will the bit. The elongated cylindrically shaped body is formed as a spiral land separated by a flute. The body is usually made of a steel alloy.

The lead end of the bit usually has self centering, self feeding cutter elements which are usually made of carbide. Examples of such drill bits and materials are found in U.S. Pat. No. RE 19,182; U.S. Pat. No. 1,887,374; U.S. Pat. No. 4,008,976; U.S. Pat. No. 4,143,723; U.S. Pat. No. 4,134,616; and U.S. Pat. No. 4,356,873.

Applicant's own patent is directed to a single flute bit having a replaceable carbide lead screw and a carbide cutter insert for better chip removal.

U.S. Pat. No. 6,024,520 to Haughton et al is directed to a drill bit for producing circular cross section bores by the use of 3 separate blades on the leading end of the bit.

SUMMARY OF THE INVENTION

A self feeding drill bit for making a smooth bore in a workpiece has a spiral land and flute with a leading end carrying a centered lead screw. The leading end of the bit has a cutter extending from said lead screw to the circumference of the bit. Diametrically opposed to the cutter is an inscriber formed as a curved blade by the periphery of the leading land. In use, the inscriber makes a smooth surfaced cut in the workpiece with the cutter removing the remainder of the workpiece within the scribed cut.

Accordingly, it is an objective of the instant invention to provide a drill bit that is self feeding and produces a smooth bore. The bore has entrance and exit holes without frazzle or splinters.

It is a further objective of the instant invention to provide a drill bit with a leading end having a removable lead screw located between an inscriber and a cutter.

It is yet another objective of the instant invention to teach a method of producing a smooth bore drill hole without frazzle at the entrance or exit.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
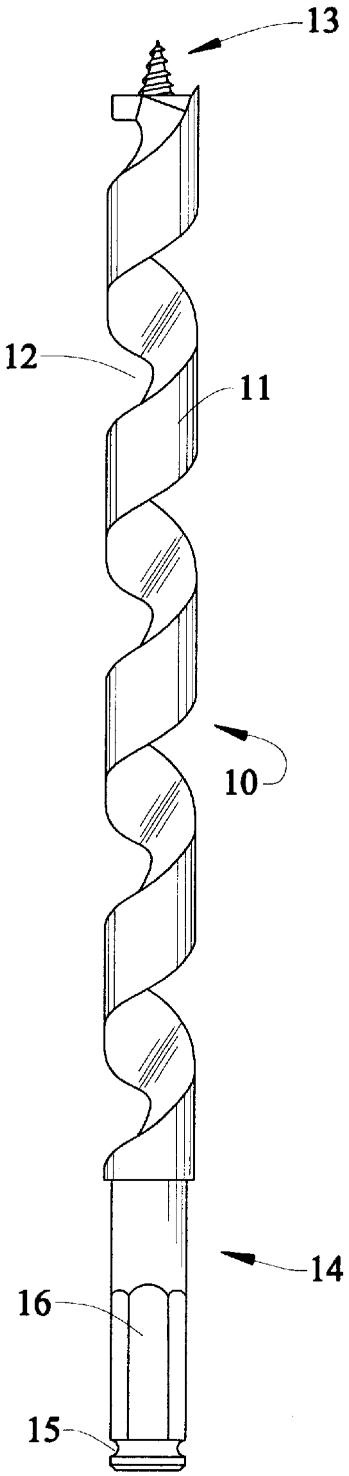
FIG. 1 shows a plan view of the drill bit of this invention.

The drill bit 10, of FIG. 1, has a continuous land 11 and flute 12 extending from the leading end 13 to the shank 14. The shank 14 has a circumferential groove 15 and planar side walls 16 for connection with a drill. Other structures may be substituted or added to the groove 15 and side walls 16, since these elements are merely complimentary to the structure of the drill chuck.

Figure 2:
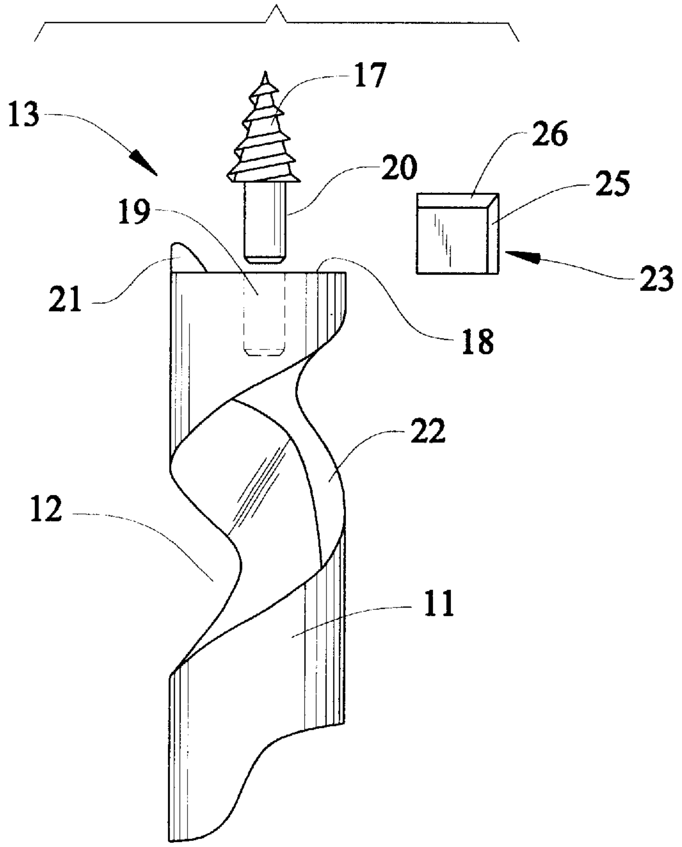
FIG. 2 shows an exploded view of one embodiment of the leading end of the drill bit of this invention.

The leading end 13, as shown in FIG. 2, has a lead screw 17 made of carbide steel. The lead screw may be removable and replaceable to lessen the cost of the drill bit. The leading end of the drill bit land has a generally flat shoulder 18 which contains a recess 19 to receive the base 20 of the lead screw. Other embodiments of the bit may have the lead screw permanently affixed to the bit body 10 or the bit may be one piece. The axis of the lead screw is an extension of the longitudinal axis of the bit 10.

The outer periphery 21 of the leading edge of the land 11 is formed as a cutting edge because the flat shoulder 18 terminates short of the outer diameter of the leading edge. The forming of the cutting edge may begin a turn before the lead end, as shown at 22. This cutting edge 21 forms an inscriber that creates a cylindrical cut in the workpiece between the lead screw and the main body of the drill. This inscriber cuts a path that is parallel with the outer diameter of the body, as opposed to the cutter 23 which cuts perpendicular to the path of the bit. In this manner, the bore of the drilled hole is smooth. The entrance hole and exit hole are scribed by the periphery 21 before the cutter 23 contacts the workpiece thereby reducing tearing of the workpiece.

Figure 3:
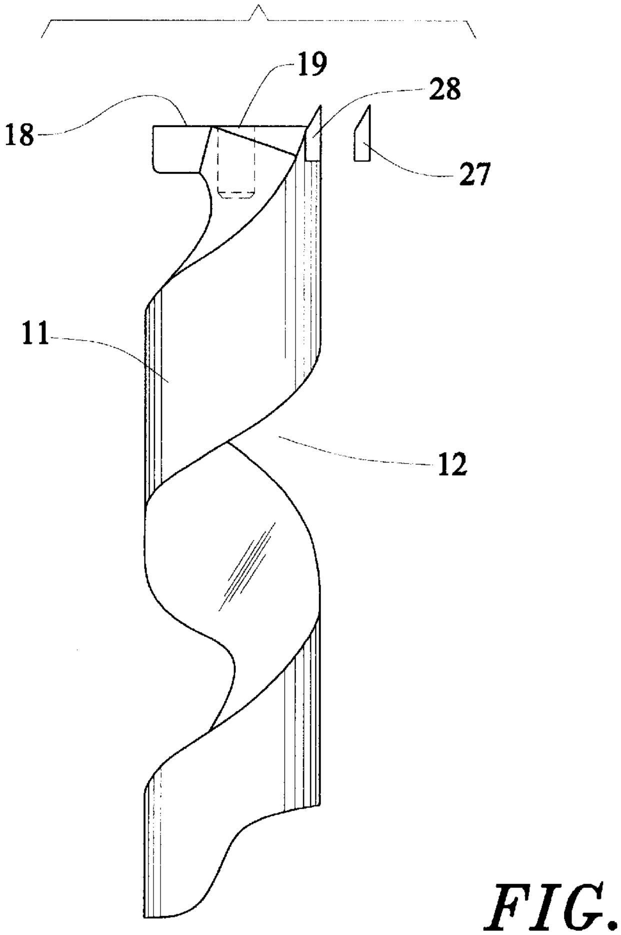
FIG. 3 shows an exploded view of one embodiment of the leading end of the drill bit of this invention without the lead screw.

The cutting edge 21 may be made of a carbide steel 27 which is replaceable in a slot 28 on the drill bit, as shown in FIG. 3, or permanently attached to the bit. As shown in FIG. 2, the inscriber may be a unitary portion of the land 11. In any event, the inside surface of the inscriber smoothly transitions into the leading edge of the land 11 throughout the remainder of the bit.

Figure 4:
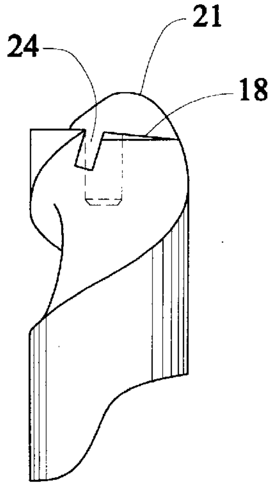
FIG. 4 shows a plan view of the leading end of the drill bit with the cutter notch.
Figure 5:
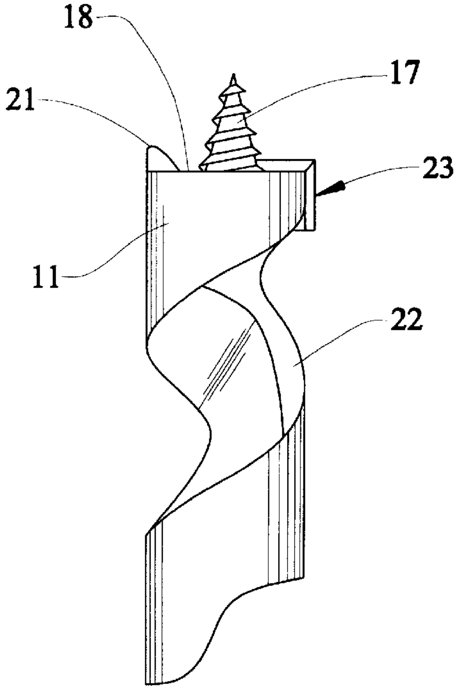
FIG. 5 shows a plan view of the leading end of the drill bit of this invention.

The cutter 23 is basically a straight edge chipper blade 26 extending radially from the lead screw 17 to the circumferential edge of the bit and a shaver blade 25 oriented at approximately 90 degrees to the chipper and tangential to the bit. The cutter may be a permanent or replaceable insert which is attached to the shoulder 18 in a notch 24, shown in FIG. 4. The notch 24 is oriented at an angle to the longitudinal axis of the bit to lessen the angle of attack of the chipper blade 26 and shaver blade 25 and reduce tearing of the workpiece. The cutter 23 removes that portion of the workpiece between the scribed cut and the lead screw 17. As shown in FIGS. 4 and 5, the leading edge of the inscriber 21 is located approximately 180 degrees from the cutter about the circumference of the bit. This angular displacement is in the direction of rotation to insure that the circumference of the bore is scribed first.

The cut workpiece material exits the bore by way of the continuous flute. The lead screw and land are self feeding in that continued rotation will cause longitudinal movement of the bit through the workpiece. This reduces the pressure necessary for penetration of the workpiece. This is especially beneficial when the workpiece is of substantial thickness.

In use, the drill bit is placed in contact with the workpiece and rotated. The lead screw centers the bit and draws the bit into the workpiece. As the body of the bit contacts the workpiece the periphery 21 of the leading edge of the land 11 forms a circular cut defining the surface of the bore. As the bit continues to turn, the cutter engages the workpiece and shaves away that portion of the workpiece between the lead screw and the inscriber.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A self feeding drill bit for making smooth surfaced bores in a workpiece having a body with a leading end and a shank, said bit body comprising a spiral land and flute extending from said leading end to said shank, said land and flute having a cylindrical diameter, said land and flute terminating in said shank, said shank having a connection means for attaching said drill bit to a drill, said leading end having a shoulder formed across said diameter, a lead screw located centrally on said shoulder, an inscriber located on one end of said shoulder, and a cutter located on the other end of said shoulder wherein said cutter is composed of a straight edge chipper and a shaver oriented tangentially to said circumference of said bit.

2. A self feeding drill bit of claim 1 wherein said shoulder has a recess and said lead screw is mounted in said recess.

3. A self feeding drill bit of claim 2 wherein said lead screw is conical and of smaller diameter than said bit body.

4. A self feeding drill bit of claim 3 wherein said lead screw is carbide steel.

5. A self feeding drill bit of claim 1 wherein said inscriber is raised above said shoulder.

6. A self feeding drill bit of claim 5 wherein said inscriber is shaped as a curved cutting blade.

7. A self feeding drill bit of claim 6 wherein said inscriber is formed as the periphery of said spiral land.

8. A self feeding drill bit of claim 7 wherein said land has a slot and said inscriber is a carbide insert affixed in said slot.

9. A self feeding drill bit of claim 4 wherein said land has a periphery and said inscriber is formed of said periphery as a curved cutting blade.

10. A self feeding drill bit of claim 1 wherein said shaver is oriented at an angle to the longitudinal axis of said bit.

11. A self feeding drill bit of claim 10 wherein said land is formed with a notch therein and said cutter is affixed in said notch.

12. A self feeding drill bit of claim 11 wherein said cutter is formed of a unitary piece of carbide and said chipper is oriented approximately 90 degrees to said shaver.

13. A self feeding drill bit of claim 12 wherein said cutter is located approximately 180 degrees from said inscriber about the circumference of said bit.

14. A self feeding drill bit of claim 4 wherein said cutter is composed of a straight edged chipper and a shaver oriented tangentially to the circumference of said land.

15. A self feeding drill bit of claim 9 wherein said cutter is composed of a straight edged chipper and a shaver oriented tangentially to the circumference of said land.

16. A self feeding drill bit for making smooth bores in a work piece having a body with a leading end and a shank, said bit body comprising a leading end and a shank with a spiral land and flute with a diameter and a cylindrical circumference extending from said leading end to said shank, said land and flute terminating in said shank, said shank having a connection means for attaching said bit to a drill, said leading end composed of a shoulder extending across a major portion of said diameter, said shoulder having a lead screw located centrally of said bit, said lead screw having a diameter less than said diameter of said bit, a cutter on said shoulder extending from the lead screw to said circumference, said cutter including a shaver extending tangentially with said circumference, and an inscriber formed in the peripheral edge of said land between said shoulder and said circumference as a curved cutter, said inscriber extending beyond said shoulder, said inscriber located approximately 180 degrees about said circumference from said cutter whereby said inscriber makes a clean incision in the workpiece and said cutter chips away the workpiece material between the incision and said lead screw with the material being removed by the flute.

17. A self feeding drill bit of claim 16 wherein said shoulder has a notch therein, said cutter being affixed in said notch, and said leading end land has a slot therein with said inscriber affixed in said slot.

18. A method of making a smooth bore through a workpiece comprising the steps of a) providing a self feeding drill bit having a leading end and a shank with a spiral land and flute defining a diameter and circumference and extending from said leading end to said shank, said shank having a connection means for attaching said drill bit to a drill, said leading end having a shoulder extending diametrically across said bit, said shoulder mounting a central lead screw, a cutter connected to one end of said shoulder extending from said lead screw to the circumference of said bit, said cutter including a shaver having a blade oriented tangentially to said circumference, and an inscriber located at the other end of said shoulder having a curved blade formed on the periphery of said land, b) attaching said bit to a drill, c) rotating said bit with said drill, d) contacting a workpiece with said lead screw, said lead screw drawing said leading end of said bit into said workpiece, e) said inscriber scoring said workpiece with a smooth incision following the circumference of said bit, f) said cutter engaging said workpiece between said smooth incision and said lead screw to produce a smooth bore in said workpiece, and g) said workpiece material removed from said bore by said flute.

* * * * *